UNITED STATES PATENT OFFICE.

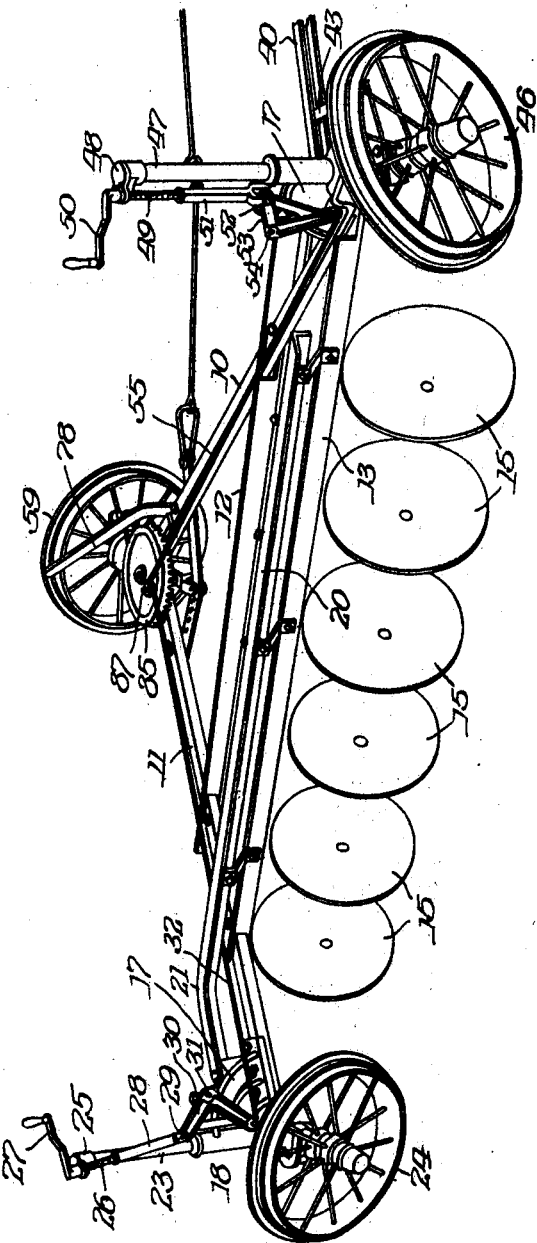

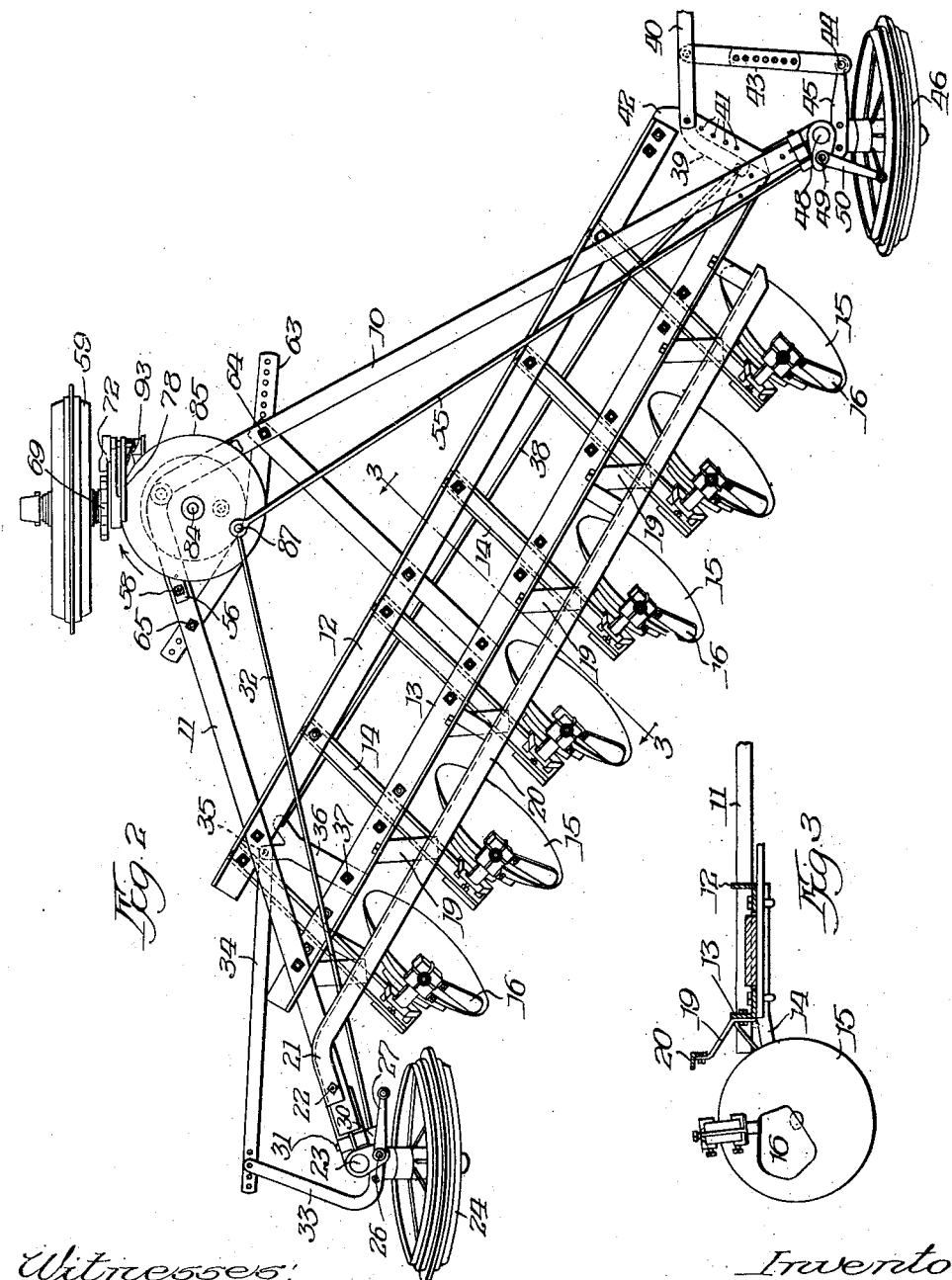

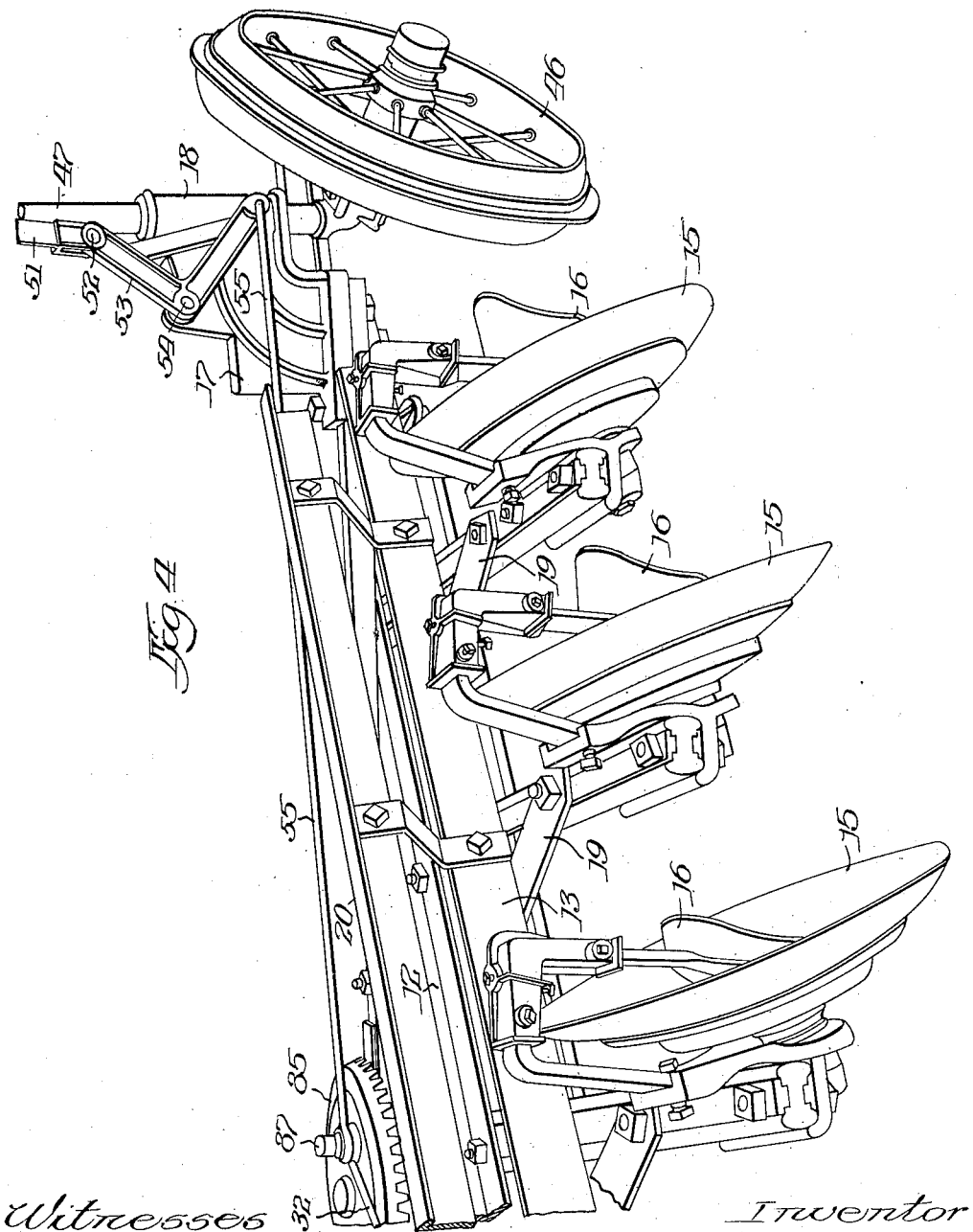

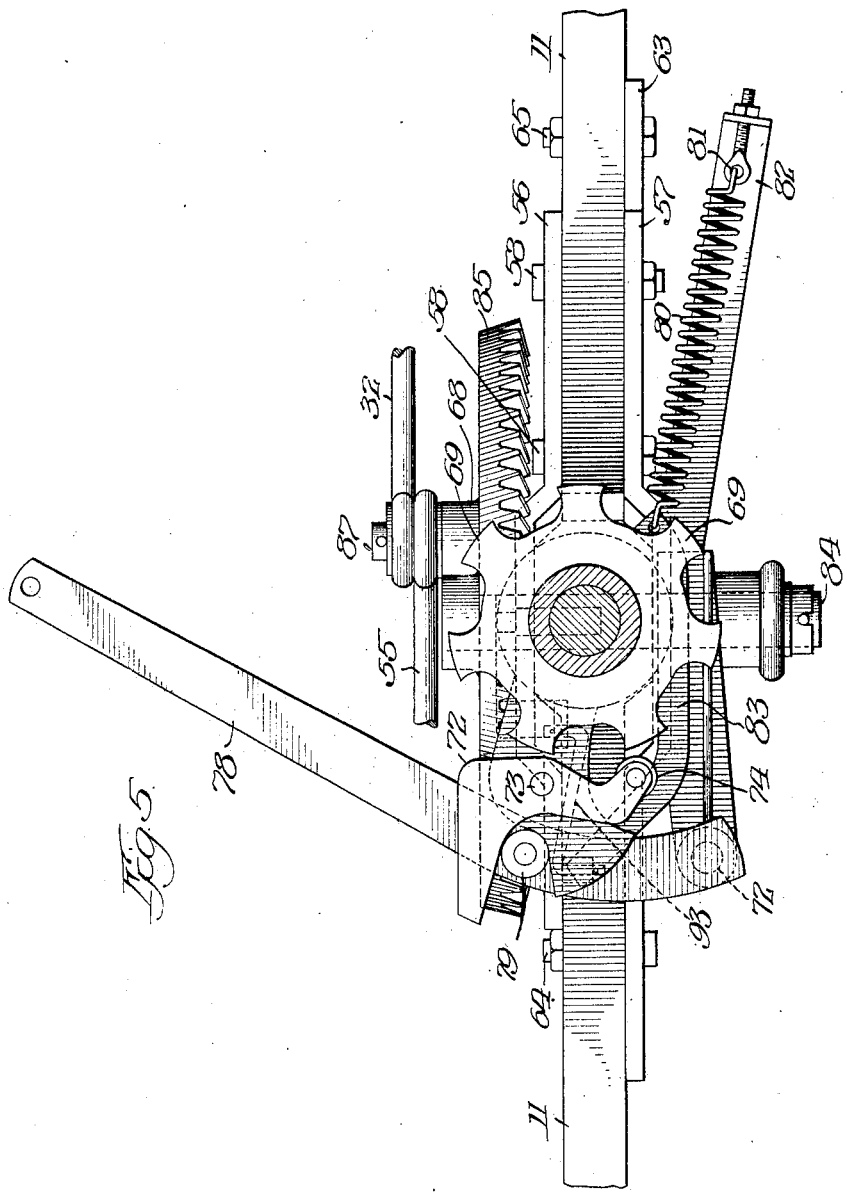

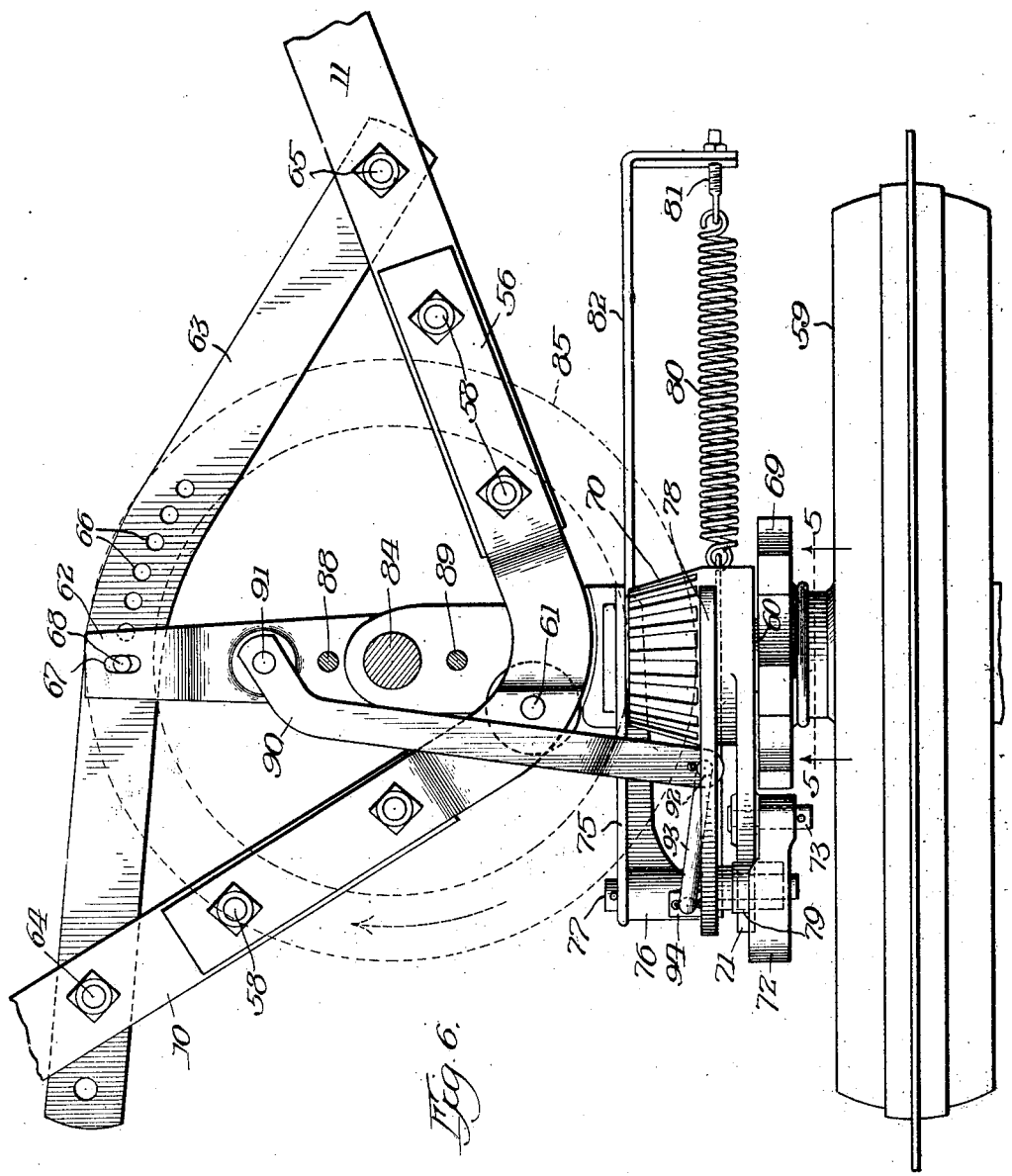

IRA A. WEAVER, OF SPRINGFIELD, ILLINOIS, ASSIGNOR, BY MESNE ASSIGNMENTS, TO THORNE BROTHERS, INCORPORATED, OF CHICAGO, ILLINOIS, A CORPORATION OF ILLINOIS.

GANG-PLOW.

1,369,583.     Specification of Letters Patent.     Patented Feb. 22, 1921.

Original application filed June 15, 1914, Serial No. 845,094. Divided and this application filed July 17, 1916. Serial No. 109,670.

*To all whom it may concern:*

Be it known that I, IRA A. WEAVER, a citizen of the United States, residing at Springfield, in the county of Sangamon and State of Illinois, have invented certain new and useful Improvements in Gang-Plows, of which the following is a specification, the same being a division of my application Serial No. 845,094, filed June 15, 1914.

My invention pertains to plows in general, but relates more particularly to gang plows of the serial raising and lowering type.

One object of the invention is the production of an automatic lifting device for the plows, which will raise them and lower them in sequence by power derived from one of the ground wheels, and which will be capable of permitting the plows to be raised manually, if required. Another object of the invention is the provision of means permitting angular adjustment of the carrying wheel from which the power is derived for raising the plows, without interfering with the action of the lifting mechanism. A still further salient feature of the invention is the provision of improved wheel-controlling mechanism in association with the draft bar.

Many other features of novelty and improvement will be apparent to those skilled in this art from the consideration of a preferred embodiment of the invention which is set forth in the accompanying drawings forming a part of this specification, and described in detail below.

In these drawings,

Figure 1 is a perspective view of a plow mechanism incorporating the features of the invention;

Fig. 2 is a plan view of the plow shown in Fig. 1;

Fig. 3 is a vertical section on line 3—3 of Fig. 2, the parts being viewed in the direction indicated by the arrows;

Fig. 4 is a fragmentary perspective view of a part of the plow, showing the same on an enlarged scale;

Fig. 5 is a vertical section on line 5—5 of Fig. 6, through the axle of the carrying wheel from which power is derived for operating the lifting mechanism; and Fig. 6 is a horizontal section just beneath the horizontal gear which such carrying wheel rotates.

Referring to the drawings, it will be observed that the machine frame, of general triangular form, consists of a front bar 10, and a rear bar 11 connected together diagonally of the direction of travel of the appliance by a pair of spaced angle bars 12 and 13, to the horizontal flanges of which are fastened, in any approved manner, the series of plow beams 14, 14, each carrying on its protruding rear end a revoluble disk-plow 15 and associated scraper 16. As is illustrated, the front and rear bars 10 and 11 extend beyond the companion angle-bars 12 and 13, and each, at the terminal of such protruding end, has fastened thereto a bracket 17 provided with a vertical bearing 18. The angle bar 13 has secured thereto a series of upwardly extended brackets or supports 19 carrying at their upper ends a bar 20 disposed parallel to the angle bars 12 and 13, and acting not only to stiffen the frame, but also as a guard above the disks 15. The left-hand end of the bar 20, as the parts are viewed in Fig. 2, is bent rearwardly at 21 into register with the adjacent bracket 17, to which it is attached at 22.

The vertical bearing 18 of this bracket receives the upright cylindrical portion 23 of the axle carrying the rear furrow-wheel 24. This axle 23 carries at its top end a bracket 25 with a bearing slidingly and revolubly receiving a screw 26 equipped with a turning handle 27, and internally engaging a threaded sleeve or rod 28 pivoted at 29 to one arm of a bell-crank 30 fulcrumed at 31 on the support or bracket 17; the other arm of the bell-crank having pivotal connection with a forwardly extended rod 32, described hereinafter.

The axle of the wheel 24 has fixed thereto a bent bar 33 (see Fig. 2) adjustably pivoted to a link 34, the other end of which is pivoted at 35 to a rock arm 36 oscillatingly mounted on the angle bar 13 at 37. This rocker arm 36 has also connected thereto a rod 38 disposed beneath the plow beams and pivotally connected at its forward end to an arm 39 forming an extension of the draw-bar 40, which may be adjustably connected to the main frame in any one of a plurality of holes 41 in a plate 42 connected, as is illustrated in Fig. 2, to the ends of the two angle bars 12 and 13. Draw-bar 40, by means of a connecting strap 43, is pivotally connected at 44 to an arm 45 of the axle of the front furrow-wheel 46.

As in the case of the rear furrow-wheel 24, the axle of this front wheel 46 has a vertical cylindrical portion 47 rotatably received in the bearing 18 of the adjacent bracket 17, and at its upper end this axle has a cap 48 equipped with a bearing slidingly and revolubly receiving a screw 49 having a turning handle 50, the screw being received within a threaded aperture of the connecting bar 51 pivoted at its lower end at 52 to one arm of a bell-crank 53 fulcrumed at 54 on the bracket 17, the other arm of the bell-crank being pivotally connected to the end of a rod 55.

The other angle of the triangular frame is supplied with a pair of upper and lower spaced bars 56 and 57, connecting together the two bars 10 and 11, the adjacent ends of which are spaced apart as is clearly shown in Figs. 5 and 6, the fastening means for the parts being conveniently the bolts 58. The land wheel 59 is revolubly mounted on an axle 60, the inner portion of which is flattened, and extends between the two bars 56 and 57 to which it is fulcrumed on a pin 61 extended through apertures in the bars and flattened part of the axle. The inner end of the axle is bifurcated at 62 and straddles a curved bar 63 fastened at its ends at 64 and 65 to the frame bars 10 and 11. Bar 63 has a plurality of apertures 66 permitting the axle, by means of apertures 67 in its bifurcated end and a pin 68, to be locked in any one of a number of angular positions, it being understood that during such angular adjustment, the axle and the wheel 59 turn about the fulcrum pin 61. In this way any desired lead of the land wheel may be easily obtained.

The hub of the wheel 59 carries a ratchet wheel 69, and loosely mounted on the axle is a bevel pinion 70 having an arm 71, to which a pawl 72 is pivoted at 73, the pawl carrying a roller 74 adapted to coöperate with the teeth of the ratchet wheel so that the rotation of the ground wheel may be transmitted through the ratchet and pawl to the pinion. The pawl is also supplied with a coöperating spring $72^a$.

The axle also has fixed thereto an arm 75 having a bearing 76 for the hinge pin 77 of an operating lever 78 carrying a roller 79 adapted to coact with the tail of the pawl 72, the lever being normally pulled into the position illustrated in Fig. 5 by a coiled contractile spring 80, whose outer end is fastened at 81 to a bar 82 secured to the axle, the other end of the spring being connected to a bent bar 83 fastened to the lever 78, so that the spring exerts a direct pull upon the lever.

The axle between the plates 56 and 63 is provided with a vertical bearing accommodating an upright shaft 84, on the top of which is mounted a horizontal bevel gear 85, the teeth of which are in mesh with those of the bevel pinion 70. As is illustrated in the various figures, gear 85 has upstanding therefrom a boss 86 equipped with a pin 87, on which the forward ends of the two lifting rods 32 and 55 are rotatably mounted. The under face of the gear 85 is supplied with two downwardly-extended pins 88 and 89, which of course revolve with the gear, and they are adapted to coöperate with the bent arm 90 (see Fig. 6) fulcrumed at 91 on the inward extension of the axle, and pivoted at 92 to one end of a link 93, the opposite end of which is pivoted to a boss or lug 94 on the inner face of the lever 78.

Operation: The manner in which this appliance performs its work is substantially as follows:

Assuming that the depth of cut of the plurality of disk plows has been determined by the adjustment of the screws 26 and 49, by their respective handles 27 and 50, and that the plow is traveling forwardly in the usual manner, performing its customary plowing function, it will be obvious that, as the drawbar 40 is shifted to one side or the other, the furrow wheels 46 and 24 will be properly turned on their vertical pivots to assist in the guiding and steering of the apparatus. When the plow reaches the end of the field, and it is desired to lift the plurality of disks sequentially, so as to end all furrows on a straight line transversely to the direction of travel of the machine, the operator pulls the handle 78 forwardly in opposition to the retracting influence of the coiled contractile spring 80. Of course the land wheel 59 is constantly rotating, as well as the ratchet 69 carried on its hub, and as soon as the roller 79 on the arm 78 releases the pawl 72 by being withdrawn out of coöperative relation with its tail, the pawl, under the influence of its spring $72^a$, carries its roller 74 into one of the notches of the ratchet 69, thereby compelling the rotation of the arm 71 with the ratchet wheel, which rotation, of course, is transmitted to the pinion 70 and horizontal bevel gear 85. Gear 85 has four times as many teeth as the pinion 70, and during the sequential raising of the disk plows, the gear 85 makes a half revolution. That is to say, the pinion 70, the arm 71, ratchet 69, and wheel 59, make two complete revolutions in rotating the gear 85 a half revolution. It is necessary therefore to prevent the arm 78 and its roller 79 from engaging the tail of the pawl 72 and unclutching the latter from the ratchet 69 at the end of the first revolution of the ratchet. This is brought about by the pin 89 on the gear 85, which is so positioned on the gear that when the arm 71 and the pawl 72 have about completed the first revolution, it will have engaged the arm 90 and swung it and the arm 78 outwardly so that the roller 79 cannot coöperate with the pawl. On the completion of the second revolution, however, pin 89 will have moved away from arm 90, so that the arm 78, which of course, has been previously released by the operator, has responded to the action of spring 80 and brought the roller 79 in such position that, by engagement with the tail of the pawl, it has retracted the roller 74 from the ratchet, and broken the driving connection between the carrying wheel 59 and gear 85.

In order to secure the lifting of the plows one after the other so as to end the furrows evenly, obviously, the forward plow must be raised first and the others in sequence afterward. Since these plows are all mounted on the same rigid frame, it is necessary to lift the forward end of the frame first, and the rear end afterward, after a proper time interval, or, rather, an interval dependent upon the travel of the machine. It will be noticed that when the plows are down in operative position, as shown in Fig. 2, the angular relation of the lifting rods 55 and 32 with respect to the gear 85 and its axis is quite different; or, stated differently, the rod 55 is beyond its dead center, and the rod 32 has not yet reached its dead center. The result is that, as soon as the gear 85 begins to turn in a clockwise direction as the parts are viewed in Fig. 2, rod 55 immediately begins to swing its bell-crank 53, and the corresponding bracket 17, forming a rigid portion of the forward end of the plow-supporting frame, begins at once to slide upwardly on the vertical axle or shaft 47, beginning the initial lifting movement of the plows in proper order. The first part of this travel of the connection 87 causes no substantial movement of the bell-crank 30, or the rear end of the plow-frame; but as the pin 87 continues its rotation, it completes the lifting of the front end of the plow-frame, which remains substantially in that position because the remainder of the travel of the pin is on approximately the dead center of the rod 55. On the other hand, however, when the pin 87 is approaching and passing through its dead-center position with respect to the rod 55, it is in its most efficient position for shifting the rod 32 and raising the rear end of the plow-frame, whereby during the travel of the pin 87 through a half revolution the front end of the plow frame is gradually raised and maintained lifted, and then the rear end of the frame is raised and maintained in such position, bringing about the proper and desirable sequential lifting of the plows due to their diagonal disposition across the plow-frame.

Obviously, this elevation of the plows is brought about by a mechanism extremely simple in structure and entirely automatic in its operation after the control lever has once been manipulated to throw the parts into clutched relation, the power for the lifting of the plows being secured directly from one of the carrying wheels, in this instance the land wheel. It is furthermore to be observed that this lifting of the plows in sequence, although brought about by the rotation of a single pin, is secured by reason of the relation of the lifting rods to such pin, so that the speeds of travel of the rods will be so different as to occasion a prompt lifting of the front end of the plow-frame and a delayed elevation of the rear end, which of course causes the desired serial lift.

When it is desired to begin plowing and to have the ends of all of the furrows even crosswise of the direction of travel of the machine, the operator again manipulates the handle 78, either directly or by means of a pulling cord, and then the gear 85 will make its other half revolution and stop; the carrying wheel 59, ratchet 69, pinion 70, and associated parts, making two complete revolutions, as in the previous instance, and automatically stopping. When the gear 85 starts, the pin 87 has passed the dead center as far as the rod 55 is concerned, but has not yet reached the dead center as far as the rod 32 is concerned so that the rod 55 will at once lower the front end of the plow-frame, and, after once being lowered, will maintain it substantially in that position, because during the remainder of the travel of the pin 87 it is approaching and passing by dead center. On the other hand, when this pin 87 begins its rotation, there is substantially no movement of the rear end of the plow-frame because the pin is approaching and passing dead center with respect to the rod 32, and then travels in a path favorable for a substantial movement of the rod 32, which it occasions, resulting in the delayed descent of the rear portion of the plow frame. In this way the plows are lowered sequentially, the operation being substantially the reverse of that which takes place during the lifting. During the plow-lowering operation the pin 88 on the gear prevents the parts unclutching at the end of the first revolution of wheel 59.

It should be observed that the angular position of the land wheel 59 may be varied within wide limits without interfering with or modifying the action of the automatic plow-lifting mechanism, this being rendered possible by reason of the fact that the various parts of this mechanism are all carried on or supported by and movable with the axle as it is shifted to different positions of adjustment.

Attention is also summoned to the fact that the independent hand-lifting mechanism for the plows and their frame is directly connected to, and in a certain sense forms a part of, the automatic lifting mechanism shown and described. This manual lifting appliance may be employed for adjusting the depth of cut, and may also be used if for any reason the automatic lifting mechanism is put out of commission by accident.

A further feature of this appliance to be noted is that the clutch controlling mechanism, inserted between the carrying wheel and the lifting mechanism which it operates, permits more than one revolution of the drive wheel to effect the lifting of the plows, which of course permits a more effective and advantageous use of the power employed.

It should be observed, that, since the screws 26 and 49 support the frame from the upper ends of the vertical axle portions 23 and 47 and having sliding association with their bearings in the caps 25 and 48, the plow-frame and plows are free to rise without lifting or interfering with the action of the carrying-wheels, which construction permits the plows and frame to ascend in riding over an obstruction without swinging or swerving the wheels from their course as would be likely to occur if the wheels were lifted by the plows traveling over the obstacle. A structure of this character remains substantially true to its course even though the action of the plows is interfered with by obstructions over which they pass.

I claim:

1. In a construction of the character described, the combination of a plow-support, a plurality of plows carried thereby, a pair of lifting means connected to said support at different points, a rotary member, and a pair of connections between said lifting means and said rotary member and adapted to transmit power from said rotary member to said lifting means and operate them at varying speeds whereby the plows may be lifted serially.

2. In a construction of the character described, the combination of a plow support, a plurality of plows carried thereby, a pair of lifting and lowering means connected to said support at different points, a rotary member, and a pair of connections between said lifting and lowering means and said rotary member and disposed at angles whereby one of said connections will operate its lifting and lowering means relatively rapidly and then relatively slowly, and the other connection will operate its lifting and lowering means relatively slowly and then relatively rapidly, to secure a sequential raising and lowering of the plows.

3. In a construction of the character described, the combination of a plow-support, a plurality of plows carried by said support and arranged in a series diagonally of their direction of travel, a lifting means connected to the forward portion of said support, a lifting means connected to the rear portion of said support, and means to operate said lifting means concurrently but at varying speeds to complete the raising of the forward portion of the support first and the rear portion later to secure a serial raising of the plows.

4. In a construction of the character described, the combination of a plow-support, a plurality of plows carried by said support and arranged in a series diagonally of their direction of travel, a raising and lowering means connected to the forward portion of said support, a raising and lowering means connected to the rear portion of said support, and means to operate said raising and lowering means concurrently but at varying speeds to complete the raising and lowering of the forward portion of the support first and the rear portion later to secure a serial lifting and lowering of the plows.

5. In a construction of the character described, the combination of a frame mounted on three carrying wheels, the axles of two of said wheels having vertical portions on which the frame is adjustable, the axle of the third wheel being horizontal and angularly adjustable with reference to said frame.

6. In a construction of the character described, the combination of a suitably supported member, a plurality of plows connected to said member and arranged in a series diagonally of their direction of travel, and raising and lowering means for said member acting upon different portions concurrently but at varying speeds to raise one portion thereof more rapidly than another portion and to lower said first portion more rapidly than the second portion, whereby to secure a lifting and lowering of the plows in sequence.

7. In a construction of the character described, the combination of a plow-support, means on which said support is carried, a plurality of plows carried by said support and arranged in a series diagonally of their direction of travel, and raising and lowering means for said support acting concurrently but at varying speeds to raise one portion thereof in advance of another portion and to lower said first portion in advance of the lowering of the second portion, whereby to secure a lifting and lowering of the plows in sequence.

8. In a plow, the combination of a crank, means to rotate the crank, plows, and lifting mechanism for said plows including a plurality of rigid arms connected to said crank at different angles.

9. In a plow, the combination of a crank having a substantially vertical axis, means to rotate said crank, plows, and lifting mechanism for said plows including a plurality of rigid arms connected to said crank at different angles.

10. In a plow-construction of the character described, the combination of carrying-wheels, axles for said wheels having vertical portions, an axle cap on the upper end of each of said portions, a plow-support slidable on said axle portions, means slidable through said axle caps supporting said plow-support from said caps, and plows mounted on said support, whereby the plows are free to ride over obstructions without lifting said wheels.

In witness whereof I have hereunto signed my name in the presence of two subscribing witnesses.

IRA A. WEAVER.

Witnesses:
R. C. BENNETT,
D. D. FOGGU.